United States Patent [19]

Chen et al.

[11] 4,086,001

[45] Apr. 25, 1978

[54] PLANAR OPTICAL WAVEGUIDE

[75] Inventors: Di Chen, Minnetonka; Barry G. Koepke, Burnsville, both of Minn.

[73] Assignee: Honeywell Inc., Minneapolis, Minn.

[21] Appl. No.: 540,919

[22] Filed: Jan. 13, 1975

[51] Int. Cl.² .............................................. G02B 5/14
[52] U.S. Cl. .................................... 350/96.14; 350/96.19
[58] Field of Search .................................. 350/96 WG

[56] References Cited

U.S. PATENT DOCUMENTS 3,719,462   3/1973   Andreath, Jr. et al. ........ 350/96 WG

OTHER PUBLICATIONS

"Optical Switch and Modulator in Parallel Waveguides" by Lean, IBM Tech. Disc. Bull. vol. 17, No. 4, Sept. 74.

*Primary Examiner*—John K. Corbin
*Assistant Examiner*—Stewart Levy
*Attorney, Agent, or Firm*—Omund R. Dahle

[57] ABSTRACT

A thin optical waveguide is formed by a waveguide region having an index of refraction greater than the index of refraction of the substrate. The greater index of refraction of the waveguide region is a result of residual stress within the waveguide region.

3 Claims, 3 Drawing Figures

PLANAR OPTICAL WAVEGUIDE

ORIGIN OF THE INVENTION

This invention was made under a contract with the Department of the Navy.

REFERENCE TO CO-PENDING APPLICATION

Reference is made to a co-pending application by Enrique Bernal G. Ser. No. 540.920 entitled "Fabrication of Optical Waveguides," which was filed Jan. 13, 1975 on even date with this application and which is assigned to the same assignee as this application.

BACKGROUND OF THE INVENTION

Techniques of guiding optical waves in planar optical materials, with an ultimate objective of achieving integrated optics similar to integrated electronics have been advancing rapidly in the last few years. Optical waveguide components such as modulators, deflectors, lasers, detectors and other passive and active devices are being demonstrated and developed in research laboratories throughout the world. These can be divided into the following areas: (1) the development of techniques of guiding the optical waves, (2) the development of suitable materials media and (3) the development of modern microfabrication technology. It is of paramount importance to the objective of optical integration that all of these can be simultaneously satisfied in a material which possesses desirable physical effects.

Waveguiding in many useful optical media has been achieved. Thin film waveguides have been prepared on suitable substrates by, for example, sputtering, R.H. Deitch, E.J. West, T.G. Giallorenzi and J.F. Weller, "Sputtered Thin Films for Integrated Optics," Appl. Opt., 13, 712 (1974) and epitaxial growth, W.T. Lindley, R.J. Phelan, C.M. Wolfe and A.G. Foyt, Appl. Phys. Lett., 14, 197 (1969). Waveguiding has also been achieved by modification of the refractive index of the medium surface by diffusion, I.P. Kaminow and J.R. Carruthers, Appl. Phys. Lett., 22, 326 (1973); proton irradiation, E.R. Schineller, R.P. Flan and D.W. Wilmot, "Optical Waveguides Formed by Proton Irradiation of Fused Silica," J. Opt. Soc. Am., 58, 1171 (1968); and ion implantation, E. Garmire, H. Stoll, A. Yariv and R.G. Hunsperger, Appl. Phys. Lett., 21, 87 (1972).

SUMMARY OF THE INVENTION

The optical waveguide of the present invention includes a waveguide region having an index of refraction which is greater than the index of refraction of the substrate region. This greater index of refraction is the result of residual stress within the waveguide region. In this specification and claims. the terms "residual stress" and "residual strain" are used interchangeably to mean the stress and/or strain which exist in the waveguide region which cause an increase in the index of refraction.

DETAILED DESCRIPTION OF THE PREFERRED EMBODIMENTS

Figure 1:
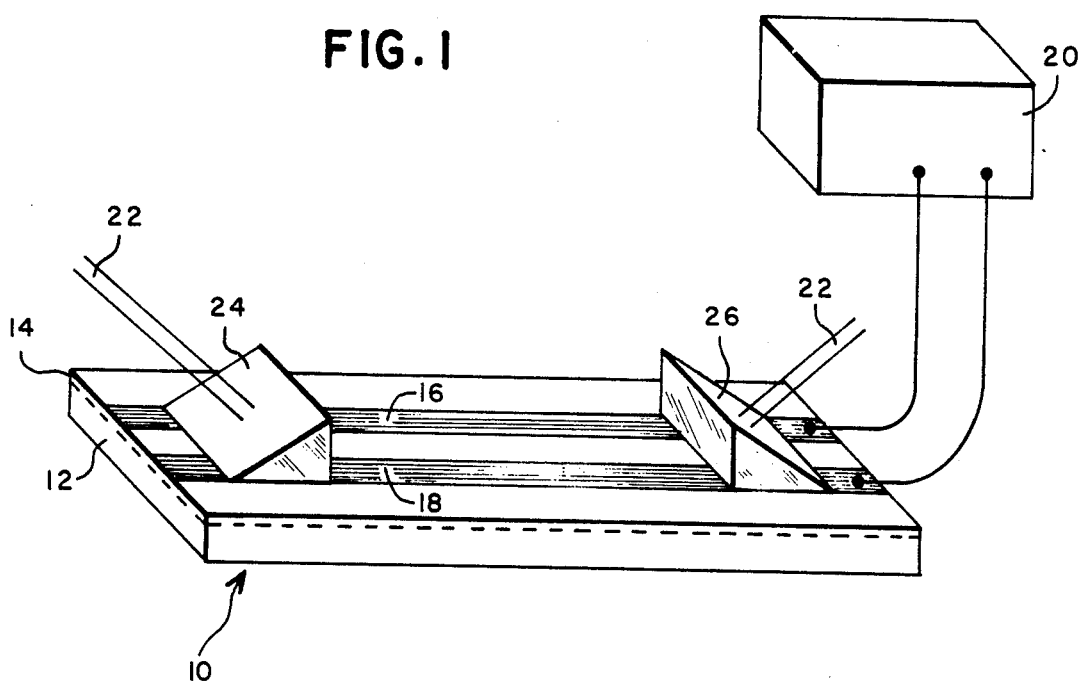
FIG. 1 shows one embodiment of the present invention.

FIG. 1 shows an optical waveguide modulator which utilizes the present invention. A body 10 of optical material (such as an electro-optic material) contains a substrate region 12 and a waveguide region 14. The index of refraction of wave-guide region 14 is greater than the index of refraction of substrate region 12 as a result of residual stress within waveguide region 14. Electrodes 16 and 18 are attached to a surface of body 10 for applying an electric field to waveguide region 14. Signal source 20 is attached to electrodes 16 and 18 for producing the electric field. Light beam 22 is coupled into and out of waveguide region 14 by prism couplers 24 and 26, respectively.

FIG. 1 is but one embodiment of the present invention. For example, electrodes 16 and 18 may taken different shapes, depending upon the particular application. In addition, if body 10 is a magneto-optic material rather than an electro-optic material, electrodes 16 and 18 and voltage supply 20 are replaced by means for applying a magnetic field to waveguide region 14. If body 10 is an acousto-optic material, electrodes 16 and 18 and signal source 20 are replaced by means for generating acoustic waves within waveguide region 14. Similarly, although prism couplers 24 and 26 are shown, other well known means for coupling beam 22 into and out of waveguide region 14 may be used. For example, grating couplers may be used instead of prisms 24 and 26.

In one successful embodiment, waveguide region 14 had a graded refractive index which was induced by optical polishing. Body 10 was a 0.2 mm thick wafer of an electro-optic material: lanthanum-modified lead zirconate titanate (PLZT) containing 9% lanthanum and having a zirconate/titanate ratio of 65/35. Body 10 was sliced with a diamond saw, lapped, and finally polished with CeO slurry on Pellon pads. This polishing action introduced sufficient modification in the refractive index from the bulk value of 2.5 to allow waveguiding in a thin region (waveguide region 14) proximate the polished surface of body 10. Electrodes 16 and 18 were gold electrodes separated by a distance of 0.2 mm which had been vacuum evaporated on a surface of body 10. Signal source 20 applied a square wave voltage waveform at 10 kHz across electrodes 16 and 18. Light beam 22 was supplied by a helium neon laser having a wavelength of 0.6328 micrometers. The waveguide pathlength was 1.26 cm, and input and output prisms 24 and 26 were rutile prisms.

Approximately two transverse electric (TE) and two transverse magnetic (TM) waveguide modes were observed. Modulation of light beam 22 was achieved by electric field induced scattering within waveguide region 14. Although scattering modes of modulation in bulk PLZT had been known in the past, electric field induced scattering in optical waveguides formed by PLZT has not previously been demonstrated.

Figure 2:
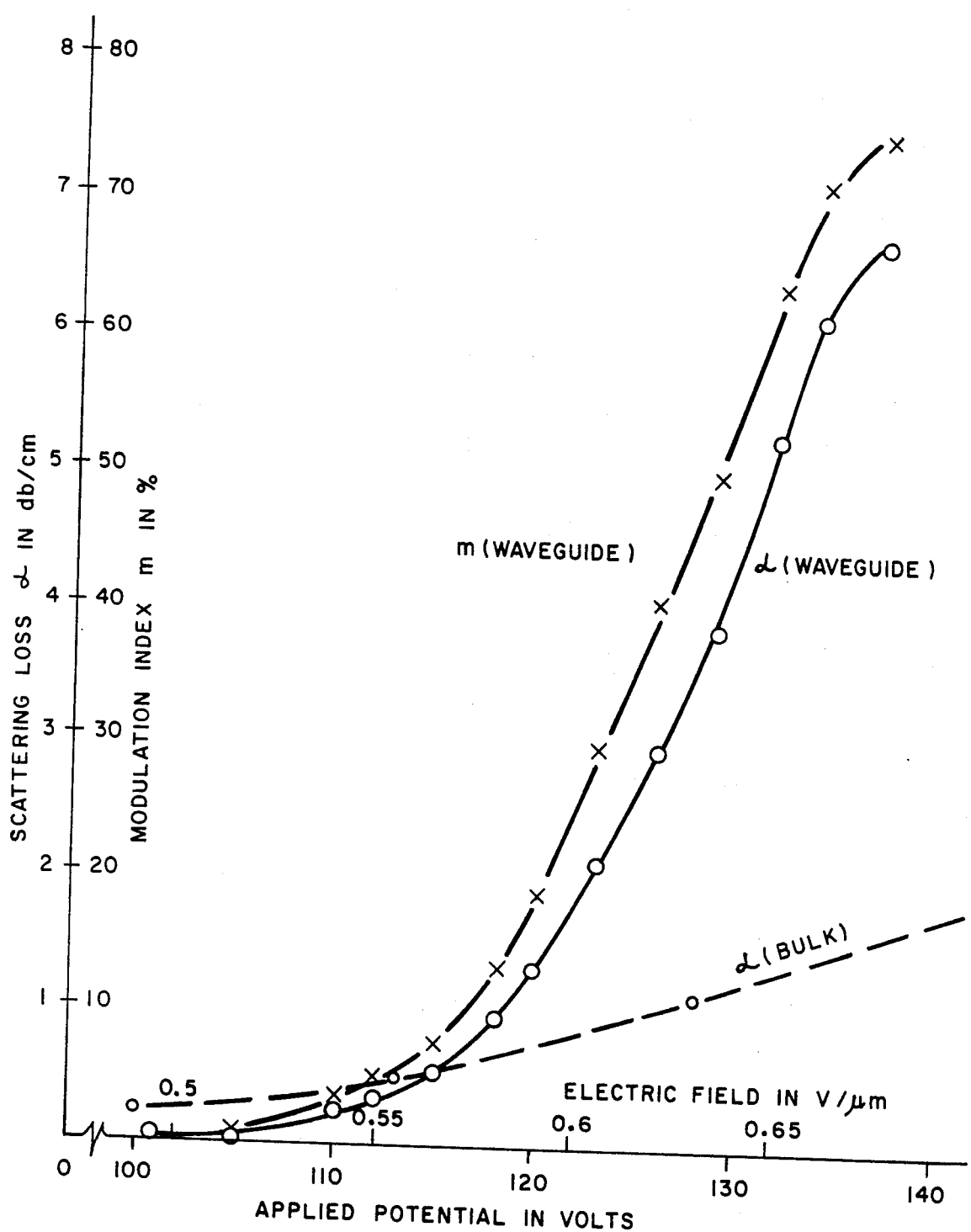
FIG. 2 shows modulation index and scattering loss as functions of peak applied voltage and electric field for an optical waveguide modulator of the type shown in FIG. 1.

The modulation index and scattering loss of the PLZT modulator described above were measured as a function of the applied peak voltage and electric field. The results are shown in FIG. 2. It can be seen that in the region between 120 to 135 volts applied peak potential, the modulation index is linearly dependent on the field. The change in modulation index in this region has a slope of 4% per volt, or 800%/(volt/micrometer). To correlate this modulation effect with the electric field induced scattering, a separate measurement was performed on bulk PLZT samples of similar composition. The detector acceptance angle for this measurement was 1.7°. The transverse electric field induced scattering loss was measured as a function of applied field. The results of this measurement are plotted in FIG. 2. The similarity between these results, especially the existence of a threshold of about 100 volts before noticeable transmission loss takes place, indicates that the waveguide modulation effect was due to electric field induced scattering.

An important advantage of the waveguide of the present invention is its applicability to batch fabrication and its potential low cost. This is particularly true if grating input and output couplers are used.

Another advantage of the waveguide modulator is its potential use for linear page composer applications in holographic memories. In this application, an array of electrodes similar to those shown in FIG. 1 can be prepared by photolithography on a single surface of body 10.

In order to fully appreciate the present invention, it is necessary to study the effect of residual stress (or strain) on the optical properties of a material. The optical properties are described by the refractive index $n$, or more strictly speaking by components of the optical impermeability tensor B. Where $$B = (1/\epsilon) = (1/n^2)$$

and $\epsilon$ is the optical dielectric tensor. The change in B due a strain S defines the photoelastic tensor $p$:

$$\Delta B = pS.$$

Noting that the strain induced change $\Delta n$ is typically small compared to $n$, i.e. $\Delta n << n$, gives the relationship:

$$\Delta n = -\tfrac{1}{2} n^3 ps$$

The magnitude of the tensor components of $p$ may vary in a given material from zero to some large value with either a positive or negative sign. In spite of this, it is possible to estimate (usually within about ±30 percent) the magnitude of the maximum photoelastic component using the following empirically established guide:

$$|P_{max}| = \begin{array}{l} 0.21 \text{ (water-insoluble oxides)} \\ 0.35 \text{ (water-soluble oxides)} \\ 0.20 \text{ (alkali halides)} \end{array}$$

The supporting data for this observation is given by D.A. Pinnow, "Guidelines for the Selection of Acousto-optic Materials," IEEE J. Quantum Electronics, QE-6, 223 (1970). Pinnow also gives index of refraction data and velocity of sound data (related to Young's modulus) for a variety of materials of interest in integrated optic waveguides.

From the knowledge of $n$ and $p$, an estimate of $\Delta n$ can be obtained if the magnitude of the residual strains $S_r$ is known. These estimates of $S_r$, coupled with the known ranges of $n$ and $p$ gives the estimate:

$$10^{-3} < \Delta n < 10^{-2}$$

for unannealed surfaces.

In discussing the nature and extent of the changes introduced into a ceramic by abrasive machining and finishing operations, it is important to first distinguish between different types of materials according to their ability to deform under ordinary stresses and temperatures. The classification is shown in Table 1 (from B.G. Koepke and R.J. Stokes, "Grinding Damage in Ceramics," Naval Research Reviews, 27, 1 (October, 1974)).

TABLE 1

| Category | Mechanical Behavior of Materials | |
|---|---|---|
| | Completely Brittle | Semi-Brittle |
| Deformation Condition | Hard-dislocations cannot move until stresses approach theoretical strength. Brittle-noncrystallographic crack propagation (conchoidal fracture) | Soft-dislocations can move at high stresses. Brittle-crystallographic crack propagation (cleavage fracture). |
| Types of Damage | Plastic deformation confined to surface region, as a result of high stress concentration at cutting tip. High residual stresses in thin layer. | Plastic deformation with high dislocation density. Layer generally thickens in semi-brittle materials. Exhibits high residual stresses (up to ⅔ yield strength). |
| Examples | Alumina Barium titanate Probably LiNbO$_3$ SBN TiO$_2$ YAG | Magnesia Ferrite Probably PLZT PbMoO$_4$ KDP |
| Hardness (Mohs) | 6 - 8 | 3 - 5 |

These distinctions are helpful because the nature of the machining (e.g., polishing) damage is different in the two types of ceramics. Studies have been carried out on materials representative of each group. Magnesia (MgO) has been studied by B.G. Koepke and R.J. Stokes, "A Study of Grinding Damage in Magnesium Oxide Single Crystals," J. Mat. Sci., 5, 240 (1970); B.G. Koepke and R.J. Stokes, "Grinding Forces and the Machining of Magnesium Oxide Crystals," Journal of Materials Science, 7, 485 (1972); B.G. Koepke, "An Assessment of Surface and Subsurface Damage Introduced in Ceramics by Semi-finish Grinding Operations," The Science of Ceramic Machining and Surface Finishing, S.J. Schneider and R.W. Rice, eds., NBS Special Publication, 348, 317 (1972); R.J. Stokes, "Effects of Surface Finishing on Mechanical and Other Physical Properties of Ceramics," ibid p. 317. Studies on alumina (Al$_2$O$_3$) are described in B.G. Koepke, "An Assessment of Surface and Subsurface Damage Introduced in Ceramics by Semi-finish Grinding Operations," supra; B.J. Hockey, "Observations on Mechanically Abraded Aluminum Oxide Crystals by Transmission Electron Microscopy," The Science of Ceramic Machining and Surface Finishing, S.J. Schneider and R.W. Rice, eds., NBS Special Publication, 348, 317 (1972); and B.J. Hockey, "Plastic Deformation of Aluminum Oxide by Indentation and Abrasion," J. Amer. Ceram. Soc., 54, 223 (1971).

In the present invention, the finishing operations like lapping and polishing are more important than the rough shaping operations like grinding. Some discussion will be made of the depth of grinding damage, however, to illustrate how much material must be removed in the lapping and polishing to completely remove the grinding damage.

Abrasive machining introduces two types of damage into a workpiece, brittle fracture and plastic deformation. The relative amounts of each generally depend on the severity of the operation and the abrasive size. A grinding wheel for instance is expected to introduce more cracking than a polishing wheel.

In semi-brittle materials, plastic deformation is a recognizable type of machining damage in every case. Grinding MgO with a 100 grit diamond wheel, for instance, results in a plastically deformed layer extending about 75μm beneath the machined surface. B.G. Koepke and R.J. Stokes, "A Study of Grinding Damage in Magnesium Oxide Single Crystals," supra. Polishing and lapping generally produce a plastically deformed layer containing fewer cracks than that produced by grinding. This layer can exhibit higher residual stresses since cracking can relieve the residual stresses.

Residual stresses in machined semi-brittle ceramics can be appreciable. In ground MgO, residual surface stresses on the order of ⅔ yield strength of the material have been observed. E. Bernal G. and B.G. Koepke, "Residual Stresses in Machined MgO Crystals," J. Amer. Ceram. Soc., 56, 634 (1973).

The nature of the deformed layer adjacent to a machined surface, whether it be lapped or polished, is characterized by an extremely high dislocation density. Etch pitting studies of the deformed layer have not revealed individual dislocations indicating the densities are in excess of $10^8 cm^{-2}$, B.G. Koepke and R.J. Stokes, "A Study of Grinding Damage in Magnesium Oxide Single Crystals," supra. The deformed layers are quite discrete and can be very uniform in depth, the depth depending on the machining technique.

In completely brittle materials (e.g. alumina), plastic deformation still is a major type of machining damage. In these materials, however, the deformation is generally confined to the near surface regions since dislocation mobilities are low. In alumina a highly deformed layer is introduced by polishing with even as fine a compound as 0.25 μ diamond paste. This layer extends about 1μm beneath the polished surface and exhibits compressive residual stresses. B.J. Hockey, "Observations on Mechanically Abraded Aluminum Oxide Crystals by Transmission Electron Microscopy," supra; B.J. Hockey, "Plastic Deformation of Aluminum Oxide by Indentation and Abrasion," supra.

Large areas of plastically flowed material have also been observed on samples of brittle ceramics such as alumina, $B_4C$ and silicon that have been surface ground with diamond wheels. B.G. Koepke, "An Assessment of Surface and Subsurface Damage Introduced in Ceramics by Semi-finish Grinding Operations," supra.

In all cases, the deformed regions appear to be more a result of the high stress concentrations at the cutting tips of the individual abrasive grains rather than high cutting temperatures. Even brittle materials will deform at low temperatures if the shear stresses at the cutting tip of an abrasive grain approach the theoretical shear strength, i.e. G/10 where G is the shear modulus. Stresses of this magnitude are easily reached in surface grinding. B.G. Koepke and R.J. Stokes, "Grinding Forces and the Machining of Magnesium Oxide Crystals," supra. It is believed that the magnitude of the stresses produced by other types of machining operations such as polishing also reach G/10. Since the shear stresses are about one half of the uniaxial stresses and G is about one half of Y (Young's modulus), the stresses introduced during polishing should be about Y/10.

The plastic deformation of the surface that occurs during machining leaves the surface in a highly strained state. The residual elastic strains, $S_r$, vary widely depending on the material and the method of machining.

In general, they must be less than the yield strength σY, divided by the uniaxial compressional modulus (Young's Modulus) Y:

$$S_r < \sigma Y/Y < Y/10Y < 1/10.$$

These are the maximum residual elastic strains that would be measured, for example, in an x-ray experiment that measures the lattice constant of the deformed regions. These are estimated to lie in the range $$10^{-3} \leq S_r \leq 10^{-2}$$

for polished surfaces that are not thermally annealed. For example, x-ray diffraction studies of epitaxially grown layers show that they can be strained in this range due to lattice mismatch without plastic deformation.

The above estimates of Δn and of the depth of damage show that waveguiding is possible at the surface of many materials. In order for this effect to be useful, the damaged layer must be quite uniform in thickness, and the residual stress must be quite uniform in magnitude, since any nonuniformity will cause light scattering and poor transmission.

To provide an estimate of the magnitude and depth of the surface refractive index change for proper waveguiding, a calculation of the propagating modes was made on three typical material refractive index values, with the assumption that a surface-stressed layer causes a change in n by 0.001 or 0.0001. The results are summarized in Table 2.

TABLE 2

| Refractive Index n | Increases in n at the surface Δn | Minimum Surface Layer Depth μm | | |
|---|---|---|---|---|
| | | $TE_0$ | $TE_1$ | $TE_2$ |
| 1.5 | 0.001 | 2.9 | 8.7 | 14.5 |
| | 0.0001 | 9.8 | * | * |
| 2.0 | 0.001 | 2.6 | 7.6 | 12.6 |
| | 0.0001 | 8.3 | 24 | * |
| 2.5 | 0.001 | 2.2 | 6.7 | 11.2 |
| | 0.0001 | 7.5 | 21.5 | * |

*The depth exceeds 30μm

It is seen that good mode separation can be achieved with a reasonable depth of the layer having refractive index modified, for Δn in the range of 0.001 to 0.0001. These values are achievable by residual stress in most materials of interest.

In other words, the required increase in index of refraction within the waveguide region as a result of residual stress may be relatively small. If the index of refraction in the waveguide region is graded, i.e. it varies as a function of distance from the interface of the substrate and the waveguide region, the increase (near the surface) is preferably greater than about $10^{-5}$ per micrometer. If, on the other hand, there is a sharp change in the index of refraction at the interface of waveguide region 14 and substrate region 12, the index of refraction of the waveguide region 14 should exceed the index of refraction of the substrate region 12 by at least $10^{-4}$.

Although optical polishing has been described as a means for producing a stress-induced increase in index of refraction which is greater than the substrate index of refraction, other techniques for creating residual stress within the waveguide region are possible. Among these techniques for producing residual stress are diffusion, ion implantation, and lattice misfits between a substrate and an epitaxial grown waveguide region of a different material than that of the substrate. In each case, the diffusion, ion implantation, or epitaxial growth must be so designed that it results in substantial residual stress within the waveguide region. This residual stress, in turn, must cause an increase in the index of refraction of the waveguide region.

The previously mentioned co-pending patent application by Enrique Bernal G. describes another highly advantageous method of forming a waveguide having a stress-induced increase in the index of refraction. In this method, the surface of a material is locally heated with an electron beam, a laser beam, or a similar energy beam in order to plastically deform a region of the material. The plastic deformation results in a different, higher, refractive index in the deformed region. This is the same mechanism by which the layer of different refractive index is produced in polishing of surfaces. The energy beam approach, however, has an even better potential for smooth, easily controlled waveguide profile.

The scanning of a high intensity beam over the surface of the substrate produces localized heating. The range of electrons in substrates having heavy metal ions (like PLZT) is of the order of a few thousand angstroms. Because of thermal conduction, however, the depth of the heated zone can be varied from a minimum of about 1 micrometer to several micrometers. The lateral extent of the heated region is controlled by heat conduction, since the electron beam can be focused to submicron spot sizes. The width of the guide should, therefore, be similar to its depth and controllable by adjusting the beam intensity and the scan rate across the surface.

The material in the heated line tries to expand as its temperature rises, but is constrained on three sides by the adjacent material that is not heated. This causes the heated material to be under compression. At a certain temperature, the stress in the heated region exceeds the yield strength of the material and plastic deformation takes place in the heated region. As the material cools, it finds itself in a state of tension which changes the refractive index at room temperature relative to that of the undeformed material. When the resultant change increases the refractive index in the deformed region, waveguiding can be obtained.

Figure 3:
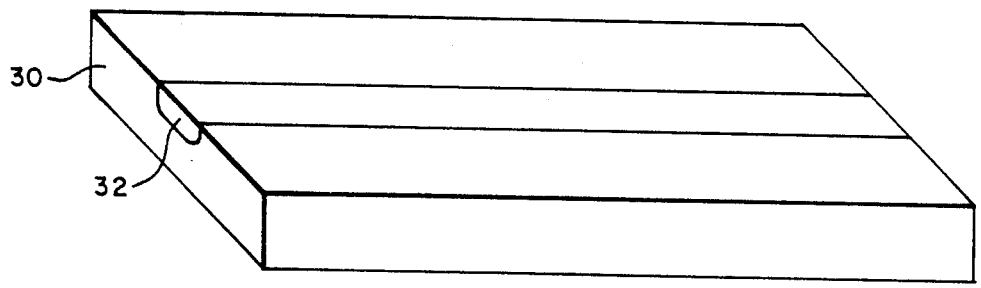
FIG. 3 shows another embodiment of the present invention.

FIG. 3 shows a waveguide structure which can be formed by the electron beam fabrication technique. Substrate region 30 and waveguide region 32 are nominally the same material. Waveguide region 32, however, has been heated by an energy beam to cause plastic deformation. This deformation has resulted in an increase in the refractive index of waveguide region 32 with respect to substrate region 30.

An advantage of the beam fabrication technique is that a wide variety of waveguide patterns can be formed. Although a straight line channel is shown in FIG. 3, curved channels can also be formed.

In conclusion, the optical waveguides of the present invention may be fabricated from a wide variety of materials by relatively simple and low cost processing techniques. Both low cost and high performance efficiency may be achieved by the optical waveguides of the present invention.

Although this invention has been described with reference to a series of preferred embodiments, workers skilled in the art will recognize that changes may be made in form and detail without departing from the spirit and scope of the invention.

The embodiments of the invention in which an exclusive property or right is claimed are defined as follows:

1. A planar optical waveguide comprising:
    a substrate having an index of refraction; and
    a stress created planar optical waveguide region in contact with the substrate, wherein the waveguide region is formed by polishing the planar waveguide region having an index of refraction greater than the index of refraction of the substrate as a result of residual stress within the waveguide region.

2. A planar optical waveguide comprising an electro-optic body of lanthanum modified lead zirconate titanate having
    a substrate region,
    a flat surface on said body, and
    a stress created planar optical waveguide region proximate said flat surface between said flat surface and said substrate region, wherein the waveguide region is formed by optical polishing,
    the substrate region having a first index of refraction and the planar waveguide region having a second index of refraction which is greater than the first index of refraction as a result of residual stress within the planar waveguide region.

3. The optical waveguide of claim 2 wherein the waveguide further comprises electrode means for applying an electric field to the waveguide region.

* * * * *